United States Patent
Sekimoto

(10) Patent No.: US 11,738,451 B2
(45) Date of Patent: Aug. 29, 2023

(54) CONTROL SYSTEM AND CONTROL METHOD OF CONTROL SYSTEM

(71) Applicant: OMRON Corporation, Kyoto (JP)

(72) Inventor: Hidehiko Sekimoto, Nagaokakyo (JP)

(73) Assignee: OMRON Corporation, Kyoto (JP)

( * ) Notice: Subject to any disclaimer, the term of this patent is extended or adjusted under 35 U.S.C. 154(b) by 160 days.

(21) Appl. No.: 17/415,741

(22) PCT Filed: Jan. 8, 2020

(86) PCT No.: PCT/JP2020/000342
§ 371 (c)(1),
(2) Date: Jun. 18, 2021

(87) PCT Pub. No.: WO2020/158320
PCT Pub. Date: Aug. 6, 2020

(65) Prior Publication Data
US 2022/0080582 A1 Mar. 17, 2022

(30) Foreign Application Priority Data
Jan. 31, 2019 (JP) .................. 2019-015444

(51) Int. Cl.
*B25J 9/16* (2006.01)
*B25J 9/00* (2006.01)
*B25J 9/10* (2006.01)

(52) U.S. Cl.
CPC .............. *B25J 9/0084* (2013.01); *B25J 9/10* (2013.01); *B25J 9/1682* (2013.01)

(58) Field of Classification Search
CPC . B25J 9/0084; B25J 9/10; B25J 9/1676; B25J 9/1682; G05B 2219/39083; G05B 2219/39135; G05B 2219/40492; G05B 2219/40497; G05B 2219/40507
See application file for complete search history.

(56) References Cited

U.S. PATENT DOCUMENTS

| | | | | |
|---|---|---|---|---|
| 6,004,016 | A | * | 12/1999 | Spector ................. B25J 9/1666 700/255 |
| 2011/0066282 | A1 | * | 3/2011 | Bosscher ............... B25J 9/1676 700/255 |
| 2012/0215351 | A1 | | 8/2012 | McGee et al. |

(Continued)

FOREIGN PATENT DOCUMENTS

| | | |
|---|---|---|
| JP | H05119814 | 5/1993 |
| JP | H08166809 | 6/1996 |

(Continued)

OTHER PUBLICATIONS

"International Search Report (Form PCT/ISA/210) of PCT/JP2020/000342," dated Feb. 10, 2020, with English translation thereof, pp. 1-4.

(Continued)

*Primary Examiner* — Dale Moyer
(74) *Attorney, Agent, or Firm* — JCIPRNET

(57) ABSTRACT

A control system is provided. A second robot in this control system has a trajectory calculation unit which calculates a trajectory of the second robot so as to avoid a first robot if it is determined that the first robot and the second robot will collide.

8 Claims, 5 Drawing Sheets

(56) References Cited

U.S. PATENT DOCUMENTS

| | | | | |
|---|---|---|---|---|
| 2013/0110288 A1* | 5/2013 | Cassano | ................ | B25J 9/1666 |
| | | | | 700/248 |
| 2015/0336269 A1* | 11/2015 | Linnell | ................ | B25J 9/1666 |
| | | | | 700/245 |
| 2017/0210008 A1* | 7/2017 | Maeda | ................... | B25J 9/1666 |
| 2018/0029233 A1* | 2/2018 | Lager | .................... | B25J 9/1676 |

FOREIGN PATENT DOCUMENTS

| | | |
|---|---|---|
| JP | 2004358630 | 12/2004 |
| JP | 2012181574 | 9/2012 |
| JP | 2015160253 | 9/2015 |
| JP | 2016538642 | 12/2016 |
| JP | 2017523054 | 8/2017 |
| JP | 2018020413 | 2/2018 |

OTHER PUBLICATIONS

"Written Opinion of the International Searching Authority (Form PCT/ISA/237) of PCT/JP2020/000342," dated Feb. 10, 2020, with English translation thereof, pp. 1-9.

Office Action of Japan Counterpart Application, with English translation thereof, dated Feb. 1, 2022, pp. 1-7.

Ahmad Yasser Afaghani et al., "Advanced-collision-map-based on-line collision and deadlock avoidance between two robot manipulators with PTP commands," 2014 IEEE International Conference on Automation Science and Engineering (CASE), Aug. 2014, pp. 1244-1251.

"Search Report of Europe Counterpart Application", dated Sep. 15, 2022, p. 1-p. 9.

* cited by examiner

CONTROL SYSTEM AND CONTROL METHOD OF CONTROL SYSTEM

CROSS-REFERENCE TO RELATED APPLICATION

This application is a 371 application of the International PCT application serial no. PCT/JP2020/000342, filed on Jan. 8, 2020, which claims the priority benefit of Japan Patent Application No. 2019-015444, filed on Jan. 31, 2019. The entirety of each of the above-mentioned patent applications is hereby incorporated by reference herein and made a part of this specification.

TECHNICAL FIELD

The present invention relates to a control system, a control method of a control system, a control program, and a computer-readable recording medium.

RELATED ART

As a conventional technique of a control system for avoiding collision between robots, there is a technique described in Patent Document 1. According to the technique, by executing a region declaration of a hybrid interference region, a booking for access, presence or the like once before an operation program requiring interlocking, programming that does not consider interlocking (locking/unlocking before and after the operation program) becomes possible. Accordingly, even if (during teaching) control is not performed in real time, interlocking is appropriately and automatically performed, and inconsistency of the entire system does not occur.

PRIOR-ART DOCUMENTS

Patent Documents

Patent Document 1: Japanese Translation of PCT International Application Publication No. 2016-538642

SUMMARY OF THE INVENTION

Problems to be Solved by the Invention

However, in the conventional technique as described above, it is necessary to create a program for region declaration. The program for region declaration is a robot-specific program determined for each robot according to various conditions such as equipment around an installation position or a positional relationship with any other robot. Hence, the program is created for each robot by a user who uses the robot, which is a burden on the user.

One aspect of the present invention aims to realize a control system in which burden on a user who creates a user program that instructs a robot to perform a motion is reduced by the robot itself avoiding collision with any other robot.

Means for Solving the Problems

In order to solve the above problems, a control system according to one aspect of the present invention is a control system in which multiple robots with multiple joints are connected to a same network. The multiple robots include a first robot and a second robot. The second robot includes: a communication control unit, acquiring, via the network, control data to which trajectory identification information for specifying a trajectory from a current position to a target position of a movable part of the first robot and target position information indicating a target position of a movable part of the second robot are added; a determination unit, determining whether the first robot and the second robot collide based on the trajectory of the movable part of the first robot and a trajectory from a current position to the target position of the movable part of the second robot that is specified from a target position of the second robot; and a trajectory calculation unit, correcting the trajectory of the movable part of the second robot so as to avoid the trajectory of the movable part of the first robot in the event of collision between the first robot and the second robot.

In order to solve the above problems, a control method according to one aspect of the present invention is a control method of a control system in which multiple robots are connected to a same network. The multiple robots include a first robot and a second robot. In the second robot, the following steps are performed. Control data to which trajectory identification information for specifying a trajectory from a current position to a target position of a movable part of the first robot and target position information indicating a target position of a movable part of the second robot are added is acquired via the network. In a determination step, whether the first robot and the second robot collide is determined based on the trajectory of the movable part of the first robot and a trajectory from a current position to the target position of the movable part of the second robot that is specified from a target position of the second robot. In a trajectory calculation step, the trajectory of the movable part of the second robot is corrected so as to avoid the trajectory of the movable part of the first robot in the event of collision between the first robot and the second robot.

The control system according to each aspect of the present invention may be realized by a computer. In this case, a control program that realizes the control system on a computer by operating the computer as each part (software element) provided in the control system, and a computer-readable recording medium storing the control program also fall in the scope of the present invention.

Effects of the Invention

According to one aspect of the present invention, a control system can be obtained in which burden on the user who creates the user program is reduced.

DESCRIPTION OF THE EMBODIMENTS

Figure 1:
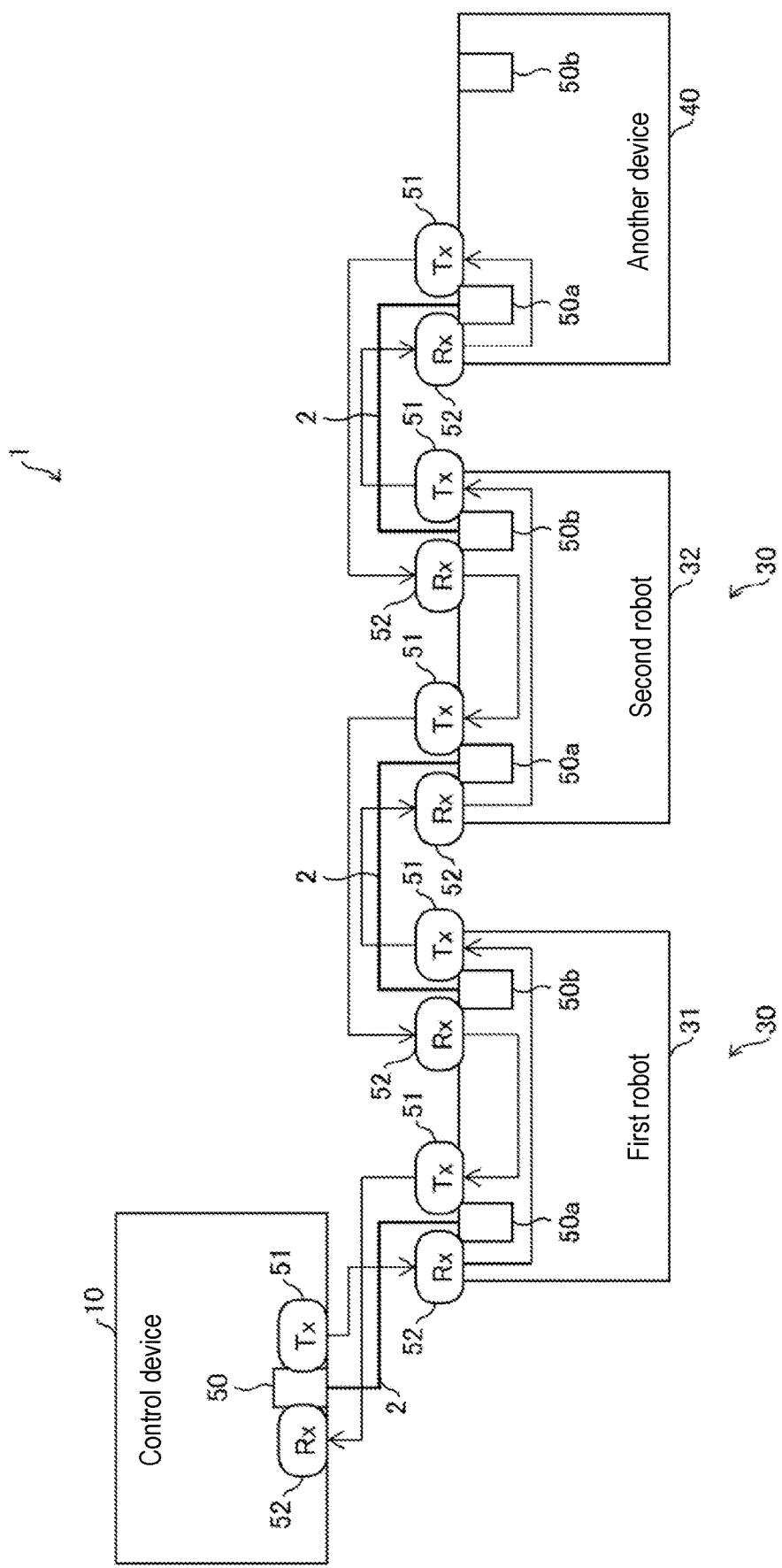
FIG. 1 is a schematic diagram showing a configuration of main parts of a control system according to one embodiment.

An embodiment (hereinafter also written as "the present embodiment") according to one aspect of the present invention is hereinafter described. The same or equivalent portions in the drawings are denoted by the same reference numerals, and descriptions thereof will not be repeated.

§ 1 Application Example

A control system according to the present embodiment includes a control device controlling an object device such as a machine or apparatus, and an object to be controlled such as a machine or apparatus connected to the control device. The object to be controlled includes multiple robots with multiple joints.

FIG. 1 is a schematic diagram showing a configuration of main parts of a control system 1 according to one embodiment. The control system 1 includes a control device 10 and multiple robots 30 connected via a field network (same network). In the control system 1, the robots 30 may also be connected to another device 40 (for example, a servo or the like) other than the robots 30 via the field network. The robots 30 at least include a first robot 31 and a second robot 32, and may further include any other robot. As an example, in the control system 1, the control device 10, the first robot 31, the second robot 32, and the another device 40 are connected in series via a LAN cable 2.

The field network transmits various data exchanged between the control device 10, the robots 30 and the another device 40. Illustrated is a configuration in which EtherCAT® being an industrial Ethernet® is adopted as the field network. However, the present invention is not limited thereto, and a network in which various data are transmitted and received in a fixed cycle can be used. For example, an industrial Ethernet® such as PROFINET®, MECHATRO-LINK®-III, Powerlink, SERCOS®-III, and CIP Motion can be used as the field network.

The second robot 32 receives information about a current position and a target position of the first robot 31 and information about a target position of the second robot 32 via the field network. The second robot 32 knows its own current position. The second robot 32 calculates a trajectory of the first robot 31 from the current position and the target position of the first robot 31, and calculates a trajectory of the second robot 32 from the current position and the target position of the second robot 32. The second robot 32 determines, from the trajectory of the first robot 31 and the trajectory of the second robot 32, whether the first robot 31 and the second robot 32 collide. In the event of collision, the second robot 32 corrects its own trajectory in order to avoid collision.

Trajectory calculation, collision determination, and trajectory correction for avoidance purposes for each robot are not performed by the control device 10 being a master device that indicates the target position, but by the second robot 32 itself being a slave device. Accordingly, calculation load can be distributed. In addition, an appropriate trajectory can be more quickly determined. Therefore, a perimeter range (range in which entry of any other robot is prevented) in consideration of operation error can be reduced. As a result, multiple robots can be disposed at reduced intervals, and a production line can be reduced in size. In addition, a user is able to create a user program that operates a robot without considering interference between the second robot and the first robot.

§ 2 Configuration Example

As shown in FIG. 1, the control device 10 is a programmable logical controller (PLC) controlling an object to be controlled such as a machine and an apparatus, and controls the robots 30 and the another device 40. A command value is transmitted from the control device 10 to the robots 30 via the field network, and each robot 30 operates based on the received command value. The command value is also transmitted to the another device 40 via the field network, and the another device 40 also operates based on the received command value. In transmission of control data via the field network, the control device 10 independently manages transmission of the control data.

In the present embodiment, it is assumed that, for each of the robots 30, a priority in avoiding collision with a movable part of any other robot 30 is set. Here, as an example, it is assumed that the robot 30 on a downstream side (the side far from the control device 10) has a lower priority than the robot 30 on an upstream side (the side close to the control device 10) in the field network. That is, the priority of the trajectory of the second robot 32 is lower than the priority of the trajectory of the first robot 31, and the second robot 32 avoids collision with the first robot 31. Accordingly, a collision between the robots 30 when the robots 30 both take an avoidance action in the same direction can be prevented. That is, a collision between the robots 30 can be more reliably avoided.

The robot 30 (here, the first robot 31) to be avoided may be referred to as the robot 30 on the master side, and the robot (here, the second robot 32) taking the avoidance action may be referred to as the robot 30 on the slave side.

Figure 2:
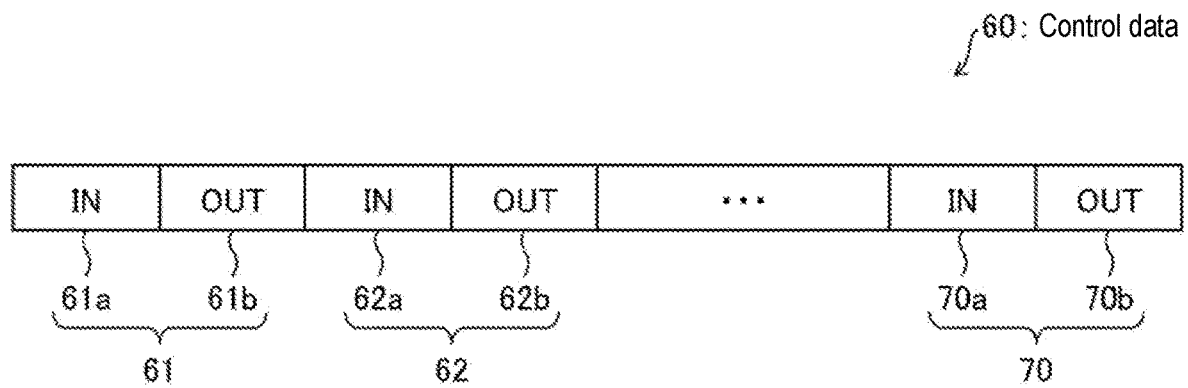
FIG. 2 is a diagram showing a configuration of control data of one frame transmitted from a control device to multiple robots and another device.

FIG. 2 is a diagram showing a configuration of a packet of control data 60 of one frame transmitted from the control device 10 to the robots 30 and the another device 40. In EtherCAT®, the robots 30 transmit and receive the control data 60 (which is a set of control data for each robot 30) via the field network every predetermined cycle. In FIG. 2, in the control data 60, at the left end is control data (trajectory identification information) 61 for controlling the first robot 31, and next to it is control data (trajectory identification information) 62 for controlling the second robot 32. If any other robot is present, the control data for each robot is provided in order next to the control data 62. The control data 61, the control data 62, and so on are contained corresponding to the number of the robots 30 connected to the field network and controlled by the control device 10. In FIG. 2, in the control data 60, control data 70 for the another device 40 is provided at the right end.

The control data for each robot includes IN data (input data) and OUT data (output data). That is, the control data 61 includes IN data 61*a* and OUT data 61*b*, the control data 62 includes IN data 62*a* and OUT data 62*b*, . . . , and the control data 70 includes IN data 70*a* and OUT data 70*b*.

The IN data is information to be transmitted from the control device 10 to the robot 30 or the another device 40. A command value for operating each robot 30 is added to each IN data by the control device 10. Specifically, by the control device 10, in the control data 60, a command value for operating the first robot 31 is added to the IN data 61*a* of the control data 61, a command value for operating the second robot 32 is added to the IN data 62a of the control data 62, . . . , and a command value for operating the another device 40 is added to the IN data 70a of the control data 70.

The command value is data determining a movement of the robot 30, and is, for example, information (target position information) indicating a target position (XYZ coordinates) in which the robot 30 moves in the present embodiment. The robot 30 calculates a trajectory according to the target position, and operates a movable part according to the calculated trajectory.

The OUT data is information to be transmitted from the robot 30 or the another device 40 to the control device 10. By each robot 30, information indicating a local device's state is added to each OUT data. Specifically, in the control data 60, information indicating a state of the first robot 31 is added to the OUT data 61b of the control data 61 by the first robot 31, information indicating a state of the second robot 32 is added to the OUT data 62b of the control data 62 by the second robot 32, . . . , and information indicating a state of the another device 40 is added to the OUT data 70b of the control data 70 by the another device 40.

The information indicating a local device's state is, for example, information indicating the current position (XYZ coordinates) of the movable part (for example, a manipulator) of each robot 30. The current position of each robot 30 may be the actual current position of each robot 30. Or, a planned position where each robot 30 is operating after a predetermined period (during a next frame) may be regarded as the current position.

In the control data 60, the control data 61 contains the trajectory identification information for specifying a trajectory from the current position to the target position of the movable part of the first robot 31. The control data 62 contains the trajectory identification information for specifying a trajectory from the current position to the target position of the movable part of the second robot 32.

Each robot 30 fetches, in the control data 60, at least the control data of a region allocated for the robot 30. For example, the robot 30 (first robot 31) on the master side fetches the IN data 61a of the control data 61 allocated for the robot 30 on the master side. Further, in the present embodiment, as described later, the robot 30 (second robot 32) on the slave side fetches, in the control data 60, not only the IN data 62a of the control data 62 allocated for the robot 30 on the slave side, but also the control data 61 allocated for the robot 30 (first robot 31) on the master side that is to be avoided, and also grasps the trajectory of the robot 30 (first robot 31) on the master side.

A flow of the control data 60 in the control system 1 is described with reference to FIG. 1 and FIG. 2. The control device 10 has an I/O port 50. The I/O port 50 includes a transmitter (denoted by "Tx" in FIG. 1) 51 and a receiver (denoted as "Rx" in FIG. 1) 52. The first robot 31 has I/O ports 50a and 50b. The I/O ports 50a and 50b each include the transmitter 51 and the receiver 52. The second robot 32 also has the I/O ports 50a and 50b, and the another device 40 also has the I/O ports 50a and 50b. That is, the first robot 31, the second robot 32, and the another device 40 each include two I/O ports.

For example, the I/O port 50 in the control device 10 and the I/O port 50a of the first robot 31 are connected by the LAN cable 2. The I/O port 50b of the first robot 31 and the I/O port 50a of the second robot 32 are connected by the LAN cable 2. The I/O port 50b of the second robot 32 and the I/O port 50a of the another device 40 are connected by the LAN cable 2. Here, the another device 40 is a device at a distal end of the field network.

The control device 10 adds information indicating the target position of each robot 30 to each IN data of the control data 60, and collectively transmits the control data 60 from the transmitter 51 to the field network (output processing). The control data 60 transmitted from the control device 10 to the field network is transmitted to the receiver 52 of the I/O port 50a of the first robot 31 in the first place, and is transmitted from the transmitter 51 of the I/O port 50b provided in the first robot 31 to the receiver 52 in the I/O port 50a of the second robot 32 in the second place. At this time, the first robot 31 accesses the region (that is, the control data 61) in the control data 60 received from the control device 10 that is allocated for the first robot 31, fetches the IN data 61a, and adds information indicating its own current position to the OUT data 61b. The control data 60 in which the information indicating the current position is added to the OUT data 61b by the first robot 31 is transmitted to the second robot 32 in the second place.

Then, like the first robot 31, the second robot 32 accesses the region (that is, the control data 62) in the received control data 60 allocated for the second robot 32, and fetches the IN data 62a. In addition, the second robot 32 also accesses the region (that is, the control data 61) in the control data 60 allocated for the first robot 31, and also fetches the IN data 61a and the OUT data 61b of the control data 61 allocated for the first robot 31. Then, the second robot 32 adds information indicating its own current position to the OUT data 62b in the control data 60. Similar processing is performed sequentially in each robot connected via the field network.

Here, in the another device 40 at the distal end, similarly, at the same time as when the IN data 70a is fetched, information indicating the current position of the another device 40 is added to the OUT data 70b. The control data 60 transmitted from the another device 40 at the distal end flows back through the field network, passes through the second robot 32 and the first robot 31 in this order, and returns to the control device 10.

During a period until the control data 60 transmitted from the control device 10 finally moves around (reciprocates) through the field network and returns, among all the robots 30 connected via the field network, the robot 30 on the master side fetches the IN data in the control data allocated for the robot 30 on the master side and adds the information indicating its own current position to the OUT data. The robot 30 on the slave side fetches the IN data in the control data allocated for the robot 30 on the slave side, adds the information indicating its own current position to the OUT data, and fetches the control data allocated for the robot 30 closer to the master side than the robot 30 on the slave side.

In this way, in the control system 1, the control data 60 is made to move around via the field network every predetermined period. The predetermined period is not particularly limited, and may be, for example, about 1 msec. A period (predetermined period) for which the control data 60 moves around through the field network once may be referred to as a frame.

The second robot 32 may be set to calculate not only the trajectory of the first robot 31 but also a trajectory of any other robot 30 among the robots 30 in addition to the first robot 31, so as to take an action to avoid collision with the any other robot 30. In this case, when the control data 60 returns from the another device 40 at the distal end, the second robot 32 may fetch the OUT data added by any other robot 30 closer to the slave side than the second robot 32.

Hence, the priorities in avoidance can be set regardless of a connection order (order of reception of the control data 60) in a network.

Figure 3:
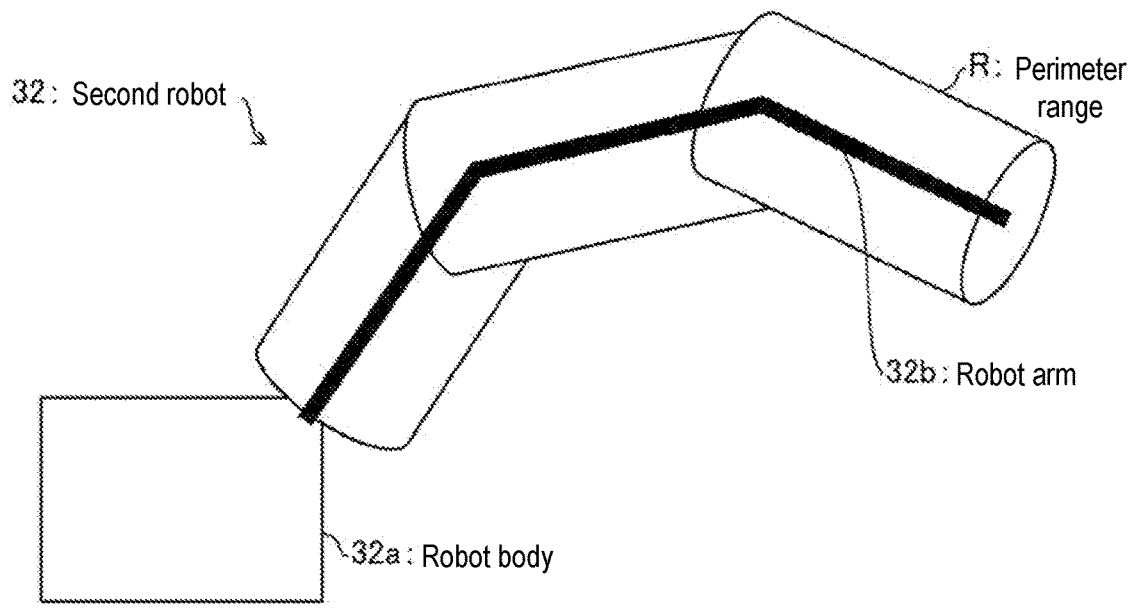
FIG. 3 is diagram showing a schematic configuration of a robot provided in a control system according to one embodiment.

FIG. 3 is diagram showing a schematic configuration of the robot 30 provided in the control system 1 according to one embodiment. In FIG. 3, the second robot 32 is illustrated as an example of the robot provided in the control system 1. However, the same description applies to any other robot 30. The second robot 32 includes a robot body 32a, and a robot arm 32b being a movable part connected to the robot body 32a and having multiple joints.

When the second robot 32 acquires the control data 60 from the first robot 31 on the upstream side, the second robot 32 acquires, in the control data 60, the target position added to the IN data 62a of the control data 62 allocated for the second robot 32, and adds information indicating a current position of the robot arm 32b being the movable part to the OUT data 62b of the control data 62 allocated for the second robot 32. Then, the second robot 32 transmits the control data 60 to the another device 40 on the downstream side. The second robot 32 calculates a trajectory from the current position of the robot arm 32b being the movable part to the acquired target position. Then, the second robot 32 moves the robot arm 32b being the movable part along the calculated trajectory. Accordingly, the current position of the robot arm 32b being the movable part is updated.

Here, the trajectory is a planned position (XYZ coordinates) of the robot arm 32b every predetermined time (every frame) from the current position to the target position. In other words, the trajectory is a set of regions where the robot arm 32b is expected to be present every predetermined time (every frame) during a movement of the robot arm 32b from the current position to the target position. The trajectory is a set of regions where the robot arm 32b is expected to be present in a four-dimensional space that combines time and space.

Here, when the second robot 32 and any other robot 30 are controlled in consideration of only the set of regions (that is, trajectory) where the robot arm 32b is expected to be present during the movement from the current position to the target position, the second robot 32 may collide with the any other robot 30 due to various errors. Hence, a predetermined perimeter range R is set in advance which is a wide region including the robot arm 32b and its surroundings, such as a tubular shape centered on the robot arm 32b. When the second robot 32 calculates the trajectory of the robot arm 32b, based on the trajectory and the perimeter range R, a perimeter range trajectory being a set of regions where the region every predetermined time is larger than the trajectory is calculated. As described later, based on the calculated perimeter range trajectory of the second robot 32 and a perimeter range trajectory of the first robot 31 on the master side, an avoidance action to avoid collision with the first robot 31 on the master side is taken. That is, when the first robot 31 on the master side is present within the perimeter range trajectory, the second robot 32 determines that the second robot 32 itself should avoid the first robot 31.

In addition, the current position may be the actual current position (the position of the robot arm 32b when the control data 60 is acquired) of the robot arm 32b being the movable part of the second robot 32, or may be the planned position of the robot arm 32b during the next frame.

Figure 4:
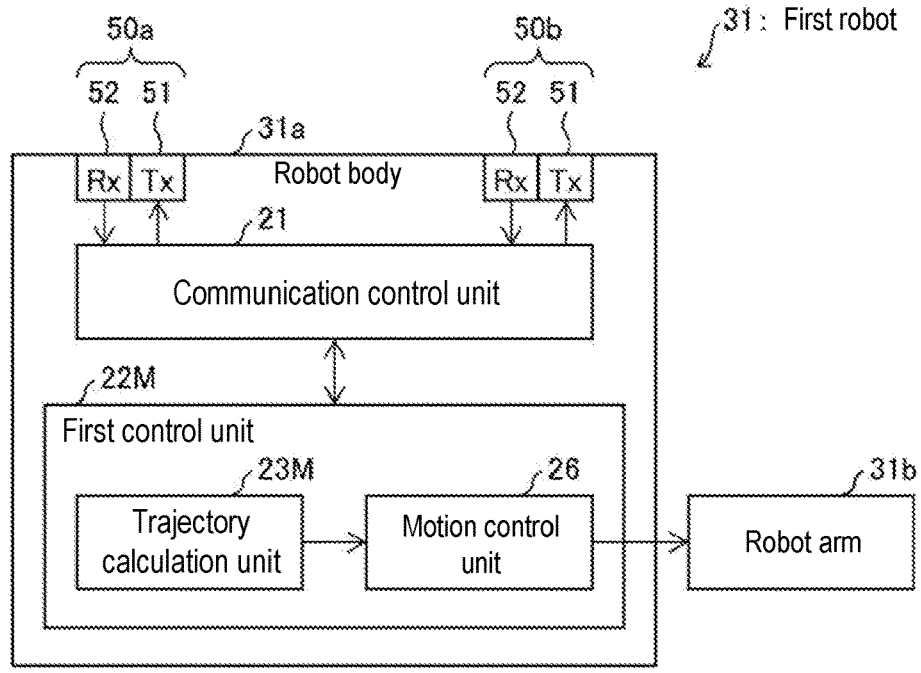
FIG. 4 is diagram showing functional blocks of a first robot according to a control system according to one embodiment.

FIG. 4 is diagram showing functional blocks of the first robot 31. In the present embodiment, the first robot 31 is the robot 30 to be avoided with which the second robot 32 is to avoid collision. That is, the first robot 31 is an example of the robot 30 on the master side that has a higher priority in collision avoidance than the second robot 32.

The first robot 31 includes a robot body 31a and a robot arm (movable part) 31b. The robot body 31a includes a communication control unit 21 and a first control unit 22M in addition to the I/O ports 50a and 50b.

The communication control unit 21 controls communication of the first robot 31 via the I/O port 50a and the I/O port 50b. The communication control unit 21 receives the control data 60 from an external device via the receiver 52 of the I/O port 50a or the I/O port 50b. The communication control unit 21 fetches the IN data 61a in the control data 60 and outputs it to the first control unit 22M, and writes the information indicating the current position to the OUT data 61b of the control data 60. The communication control unit 21 transmits the control data 60 to the external device by outputting the control data 60 to the transmitter 51 of the I/O port 50a or the I/O port 50b.

The first control unit 22M controls driving of the first robot 31. The first control unit 22M may control a motion of the first robot 31 based on various information added to the control data 60, or may generate various information to be added to the control data 60. The first control unit 22M includes a trajectory calculation unit 23M and a motion control unit 26. A flow of processing of the first control unit 22M is described with reference to FIG. 4 and FIG. 5.

Figure 5:
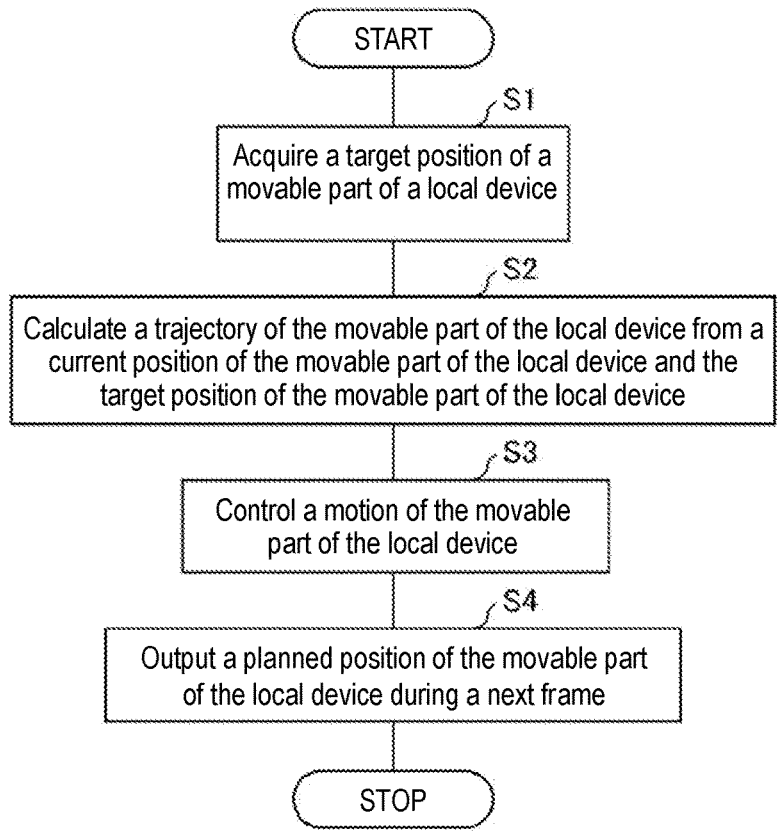
FIG. 5 is diagram showing a flow of processing of a control unit of a first robot according to a control system according to one embodiment.

FIG. 5 is diagram showing the flow of processing of the first control unit 22M of the first robot 31. The trajectory calculation unit 23M acquires, in the control data 60, a target position of the robot arm 31b (a movable part of a local device) that is added to the IN data 61a in the control data 61 allocated for the first robot 31 (step S1). Then, the trajectory calculation unit 23M calculates, from a current position of the robot arm 31b and the acquired target position, a trajectory of the robot arm 31b to the target position (step S2). Next, based on the trajectory calculated by the trajectory calculation unit 23M, the motion control unit 26 controls a motion of the robot arm 31b being the movable part of the first robot 31 (step S3). Then, from the trajectory calculated in step S2, the trajectory calculation unit 23M outputs, as the information indicating the current position, a planned position of the robot arm 31b during a next frame to the communication control unit 21 of the first robot 31 (step S4). When the communication control unit 21 receives the control data 60 in the next frame, the communication control unit 21 fetches the IN data 61a and outputs it to the first control unit 22M, and also writes the information indicating the current position to the OUT data 61b. The communication control unit 21 transmits the control data 60 to the second robot 32 on the downstream side via the transmitter 51.

Figure 6:
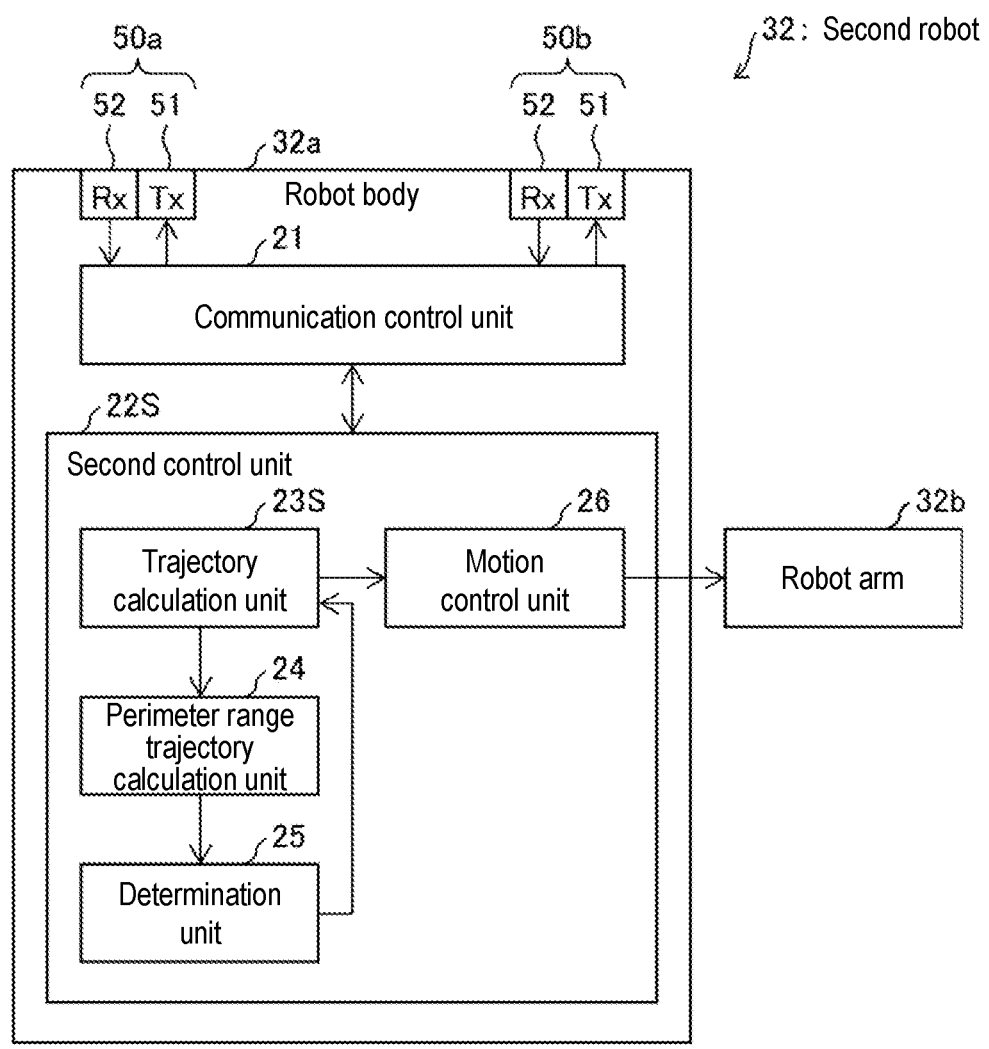
FIG. 6 is diagram showing functional blocks of a second robot according to a control system according to one embodiment.

FIG. 6 is diagram showing functional blocks of the second robot 32. In the present embodiment, the second robot 32 is the robot 30 that takes an action to avoid collision with the first robot 31. That is, the second robot 32 is an example of the robot 30 on the slave side that has a lower priority in collision avoidance than the first robot 31.

The second robot 32 includes a robot body 32a and a robot arm (movable part) 32b. The robot body 32a includes the communication control unit 21 and a second control unit 22S in addition to the I/O ports 50a and 50b.

The communication control unit 21 controls communication of the second robot 32 via the I/O port 50a and the I/O port 50b. The communication control unit 21 receives the control data 60 from an external device via the receiver 52 of the I/O port 50a or the I/O port 50b. The communication control unit 21 fetches the IN data 62a, the IN data 61a, and the OUT data 61*b* in the control data 60 and outputs them to the second control unit 22S, and writes the information indicating the current position to the OUT data 62*b* of the control data 60. The communication control unit 21 transmits the control data 60 to the external device by outputting the control data 60 to the transmitter 51 of the I/O port 50*a* or the I/O port 50*b*.

The second control unit 22S controls driving of the second robot 32. The second control unit 22S may control a motion of the second robot 32 based on various information added to the control data 60, or may generate various information to be added to the control data 60. The second control unit 22S includes a trajectory calculation unit 23S, a perimeter range trajectory calculation unit 24, the determination unit 25, and the motion control unit 26. A flow of processing of the second control unit 22S is described with reference to FIG. 6 and FIG. 7.

Figure 7:
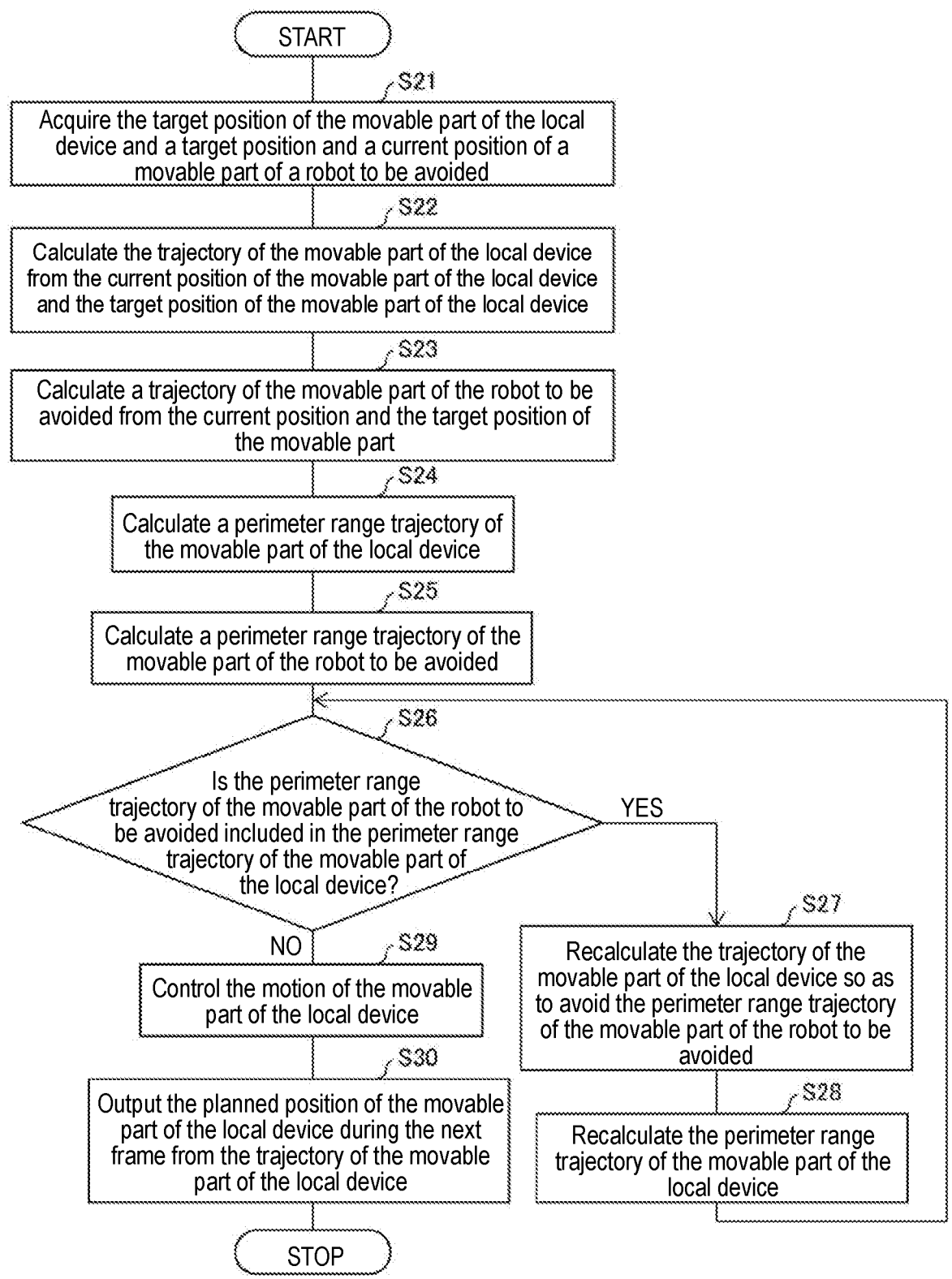
FIG. 7 is diagram showing a flow of processing of a control unit of a second robot according to a control system according to one embodiment.

FIG. 7 is diagram showing the flow of processing of the second control unit 22S of the second robot 32. The trajectory calculation unit 23S acquires, in the control data 60, a target position of the robot arm 32*b* (a movable part of a local device) that is added to the IN data 62*a* in the control data 62 allocated for the second robot 32. In addition, the trajectory calculation unit 23S acquires, in the control data 60, the target position of the robot arm 31*b* (a movable part of a robot to be avoided) added to the IN data 61*a* and the current position of the robot arm 31*b* added to the OUT data 61*b* in the control data 61 allocated for the first robot 31 to be avoided (step S21).

Next, the trajectory calculation unit 23S calculates, from the current position of the robot arm 32*b* (the movable part of the local device) and the acquired target position of the robot arm 32*b*, a trajectory of the robot arm 32*b* to the target position (step S22). Further, the trajectory calculation unit 23S also calculates, from the current position of the robot arm 31*b* and the target position of the robot arm 31*b*, the trajectory of the robot arm 31*b* to the target position (step S23).

Then, the perimeter range trajectory calculation unit 24 calculates, from the trajectory of the robot arm 32*b* calculated by the trajectory calculation unit 23S in step S22 and the perimeter range R of the robot arm 32*b* stored in advance in the perimeter range trajectory calculation unit 24 or any other storage unit, a perimeter range trajectory of the robot arm 32*b* to the target position (step S24). Further, the perimeter range trajectory calculation unit 24 calculates, from the trajectory of the robot arm 31*b* (the movable part of the robot to be avoided) calculated by the trajectory calculation unit 23S in step S23 and the perimeter range R of the robot arm 31*b* stored in advance in the perimeter range trajectory calculation unit 24 or any other storage unit, a perimeter range trajectory of the robot arm 31*b* to the target position (step S25).

Next, the determination unit 25 determines whether the perimeter range trajectory (first perimeter range trajectory) of the robot arm 31*b* calculated by the perimeter range trajectory calculation unit 24 in step S25 is included in the perimeter range trajectory (second perimeter range trajectory) of the robot arm 32*b* calculated by the perimeter range trajectory calculation unit 24 in step S24 (step S26).

In step S26, if the determination unit 25 determines that the perimeter range trajectory of the robot arm 31*b* is included in the perimeter range trajectory of the robot arm 32*b* (YES in step S26), the trajectory calculation unit 23S recalculates (corrects) the trajectory from the current position to the target position of the robot arm 32*b* so as to avoid the perimeter range trajectory of the robot arm 31*b* (step S27). For example, the trajectory calculation unit 23S corrects the trajectory of the robot arm 32*b* in a direction away from the perimeter range trajectory of the robot arm 31*b*. Then, the perimeter range trajectory calculation unit 24 recalculates, from the trajectory of the robot arm 32*b* recalculated by the trajectory calculation unit 23S in step S27 and the perimeter range R of the robot arm 32*b* stored in advance in the perimeter range trajectory calculation unit 24 or any other storage unit, the perimeter range trajectory of the robot arm 32*b* to the target position (step S28). Then, the process returns to step S26.

In step S26, if the determination unit 25 determines that the perimeter range trajectory of the robot arm 31*b* is not included in the perimeter range trajectory of the robot arm 32*b* (NO in step S26), the motion control unit 26 controls a motion of the robot arm 32*b* being the movable part of the second robot 32 based on the trajectory calculated by the trajectory calculation unit 23S (step S29). Then, from the trajectory of the robot arm 32*b*, the trajectory calculation unit 23S outputs, as the information indicating the current position, the planned position of the robot arm 32*b* during the next frame to the communication control unit 21 of the second robot 32 (step S30). When the communication control unit 21 receives the control data 60 in the next frame, the communication control unit 21 fetches the IN data 62*a*, the IN data 61*a*, and the OUT data 61*b* and outputs them to the second control unit 22S, and also writes the information indicating the current position to the OUT data 62*b*. The communication control unit 21 transmits the control data 60 to any other robot 30 on the downstream side via the transmitter 51.

In step S27, the trajectory calculation unit 23S recalculates the trajectory of the robot arm 32*b* so as to avoid the perimeter range trajectory of the robot arm 31*b*. As a method for recalculating the trajectory by the trajectory calculation unit 23S, a spatial path from the current position to the target position of the robot arm 32*b* may be changed so as to avoid the perimeter range trajectory of the robot arm 31*b*, or a moving speed of the robot arm 32*b* may be changed without changing the spatial path (that is, the planned position of the robot arm 32*b* every predetermined period may be changed).

In addition, instead of setting the priority for each of the robots 30 for causing any other robot 30 to take an avoidance action, each of the robots 30 may take an avoidance action against each other.

(Main Effects)

In this way, in the control system 1, the second robot 32 on the slave side acquires, via the field network, the IN data 61*a* and the OUT data 61*b* in the control data 61 for specifying the trajectory from the current position to the target position of the robot arm 31*b* of the first robot 31 on the master side, as well as the IN data 62*a* to which the information indicating the target position of the robot arm 32*b* of the second robot 32 is added.

In the second robot 32, the determination unit 25 determines whether the first robot 31 and the second robot 32 collide based on the trajectory of the robot arm 31*b* of the first robot 31 and the trajectory from the current position to the target position of the robot arm 32*b* that is specified from the target position of the second robot 32 (S26). In the event of collision between the first robot 31 and the second robot 32, the trajectory calculation unit 23S recalculates the trajectory of the robot arm 32*b* of the second robot 32 so as to avoid the first robot 31 (step S27).

In this way, the second robot 32 itself calculates the trajectory so as not to collide with the first robot 31. Hence, the user is able to create a user program that operates a robot without considering interference. As a result, the control system 1 can be realized in which burden on the user who creates a user program that instructs the robot 30 to perform a motion is reduced by the robot 30 itself avoiding collision with any other robot 30.

In the second robot 32, the trajectory calculation unit 23S calculates, as the trajectory, the planned position of the robot arm 32b of the second robot 32 every predetermined period from the current position of the robot arm 32b of the second robot 32 to the target position of the robot arm 32b of the second robot 32 (step S22). In this way, by calculating, as the trajectory, multiple planned positions from the current position to the target position of the robot arm 32b of the second robot 32 at the second robot 32 instead of at the control device 10 controlling the second robot 32, the user can be saved the trouble of programming the trajectory of the robot arm 32b of the second robot 32 in advance.

Based on the trajectory of the robot arm 32b of the second robot 32, the perimeter range trajectory calculation unit 24 of the second robot 32 calculates the perimeter range trajectory of the robot arm 32b of the second robot 32 (step S24); based on the trajectory of the robot arm 31b of the first robot 31, the perimeter range trajectory calculation unit 24 of the second robot 32 calculates the perimeter range trajectory of the robot arm 31b of the first robot 31 (step S25). Then, specifically, by determining whether the perimeter range trajectory of the robot arm 31b of the first robot 31 is included in the perimeter range trajectory of the robot arm 32b of the second robot 32 (step S26), the determination unit 25 determines whether the first robot 31 and the second robot 32 collide.

Accordingly, since the perimeter range trajectory of the first robot 31 and the perimeter range trajectory of the second robot 32 are calculated at the second robot 32 instead of at the control device 10 controlling the second robot 32, the trajectory of the second robot 32 that prevents collision between the two robots can be more quickly determined. Accordingly, a margin (perimeter range) secured so that the first robot 31 and the second robot 32 do not collide can be reduced. Therefore, the production line can be reduced in size. Compared to the case where the control device 10 calculates a load for calculating the perimeter range trajectory of each robot 30, the load can be distributed.

If it is determined by the determination unit 25 that the first robot 31 and the second robot 32 collide (YES in step S26), the trajectory calculation unit 23S recalculates the trajectory of the robot arm 32b of the second robot 32 so as to avoid the first robot 31 (step S27). Then, the trajectory calculation unit 23S adds information (planned position information) indicating the planned position of the robot arm 32b of the second robot 32 in the recalculated trajectory during the next frame to the OUT data 62b in the control data 62. Accordingly, another device can be notified of the current position of the robot arm 32b of the second robot 32. Therefore, based on the current position and the target position of the robot arm 32b of the second robot 32, the another device is able to take an avoidance action as appropriate so as not to collide with the robot arm 32b of the second robot 32.

Implementation Example by Software

Control blocks (especially the trajectory calculation unit 23S, the perimeter range trajectory calculation unit 24, the determination unit 25, the motion control unit 26, the communication control unit 21, and the trajectory calculation unit 23M) of the first robot 31 and the second robot 32 may be realized by a logic circuit (hardware) formed in an integrated circuit (IC chip) or the like, or may be realized by software.

In the latter case, the second robot 32 includes a computer executing instructions of a program being software that realizes each function. This computer includes, for example, one or more processors, and includes a computer-readable recording medium storing the above program. In the computer, an object of the present invention is achieved by the processor reading the program from the recording medium and executing the program. As the processor, a central processing unit (CPU), for example, can be used. As the recording medium, a "non-transitory tangible medium," for example, in addition to a read only memory (ROM), a tape, a disk, a card, a semiconductor memory, a programmable logic circuit or the like, can be used. In addition, a random access memory (RAM) or the like for developing the program may further be included. In addition, the program may be supplied to the computer via an arbitrary transmission medium (such as a communication network or broadcast wave) capable of transmitting the program. One aspect of the present invention may also be implemented in the form of a data signal embedded in a carrier wave, the data signal being embodied by the program by electronic transmission.

CONCLUSION

In order to solve the above problems, a control system according to one aspect of the present invention is a control system in which multiple robots with multiple joints are connected to a same network. The multiple robots include a first robot and a second robot. The second robot includes: a communication control unit, acquiring, via the network, control data to which trajectory identification information for specifying a trajectory from a current position to a target position of a movable part of the first robot and target position information indicating a target position of a movable part of the second robot are added; a determination unit, determining whether the first robot and the second robot collide based on the trajectory of the movable part of the first robot and a trajectory from a current position to the target position of the movable part of the second robot that is specified from a target position of the second robot; and a trajectory calculation unit, correcting the trajectory of the movable part of the second robot so as to avoid the trajectory of the movable part of the first robot in the event of collision between the first robot and the second robot.

According to the configuration, the second robot itself calculates the trajectory so as not to collide with the first robot. Hence, the user is able to create a user program that operates a robot without considering interference between the second robot and the first robot. As a result, a control system can be realized in which burden on the user who creates the user program that instructs a robot to perform a motion is reduced by the robot itself avoiding collision with any other robot.

The multiple robots receive the control data via the network every predetermined period.

The trajectory calculation unit further calculates a planned position of the movable part of the second robot every predetermined period from the current position of the movable part of the second robot to the target position of the movable part of the second robot.

As in the configuration, by calculating multiple planned positions from the current position to the target position of the second robot at the second robot instead of at the control device controlling the second robot, the user can be saved the trouble of programming the trajectory of the second robot in advance.

The second robot further includes a perimeter range trajectory calculation unit calculating a first perimeter range trajectory being a trajectory in a predetermined range including a perimeter of the movable part of the first robot based on the trajectory of the movable part of the first robot, and calculating a second perimeter range trajectory being a trajectory in a predetermined range including a perimeter of the movable part of the second robot based on the trajectory of the movable part of the second robot calculated by the trajectory calculation unit. The determination unit determines whether the first robot and the second robot collide by determining whether the first perimeter range trajectory is included in the second perimeter range trajectory.

According to the configuration, since an avoidance determination range of the first robot and an avoidance determination range of the second robot are calculated at the second robot instead of at the control device controlling the second robot, the trajectory of the second robot that prevents collision between the two robots can be more quickly determined. Accordingly, the avoidance determination range in which the first robot and the second robot may collide can be reduced. Therefore, the production line can be reduced in size. Compared to the case where the control device calculates a load for calculating the avoidance determination range of each robot, the load can be distributed.

In the event it is determined by the determination unit that the first robot and the second robot collide, the trajectory calculation unit corrects the trajectory of the movable part of the second robot so as to avoid the trajectory of the movable part of the first robot, and adds, to the control data, the planned position information indicating the planned position of the second robot in the corrected trajectory after the next predetermined period. The communication control unit outputs, to the network, the control data to which the planned position information is added.

For each of the multiple robots, a priority in avoiding collision with any other robot is set. The priority of the second robot is lower than the priority of the first robot, and the second robot avoids collision with the first robot.

According to the configuration, a collision between the robots when the robots take an avoidance action against each other can be prevented. That is, a collision between the robots can be more reliably avoided. The first robot with a high priority is able to be operated along a trajectory in which work can be more quickly performed.

The second robot calculates a trajectory of any other robot among the multiple robots in addition to the first robot, and avoids collision with the any other robot.

In order to solve the above problems, a control method according to one aspect of the present invention is a control method of a control system in which multiple robots are connected to a same network. The multiple robots include a first robot and a second robot. In the second robot, the following steps are performed. Control data to which trajectory identification information for specifying a trajectory from a current position to a target position of a movable part of the first robot and target position information indicating a target position of a movable part of the second robot are added is acquired via the network. In a determination step, whether the first robot and the second robot collide is determined based on the trajectory of the movable part of the first robot and a trajectory from a current position to the target position of the movable part of the second robot that is specified from a target position of the second robot. In a trajectory calculation step, the trajectory of the movable part of the second robot is corrected so as to avoid the trajectory of the movable part of the first robot in the event of collision between the first robot and the second robot.

The control system according to each aspect of the present invention may be realized by a computer. In this case, a control program that realizes the control system on a computer by operating the computer as each part (software element) provided in the control system, and a computer-readable recording medium storing the control program also fall in the scope of the present invention.

The present invention is not limited to the embodiments described above, and may be modified in various ways within the scope of the claims. An embodiment derived from a proper combination of technical means disclosed in respective different embodiments is also encompassed in the technical scope of the present invention.

What is claimed is:

1. A control system in which a control device and a plurality of robots with multiple joints are connected in series to a same network, wherein
   the control device is configured to add information indicating target positions of movable parts of the plurality of robots to control data, and transmit the control data to the network,
   the plurality of robots comprise a first robot and a second robot, and
   the second robot comprises a processor configured to:
      acquire, via the network, the control data to which trajectory identification information for specifying a trajectory from a current position to a target position of a movable part of the first robot and target position information indicating a target position of a movable part of the second robot are added;
      determine whether the first robot and the second robot collide based on the trajectory of the movable part of the first robot and a trajectory from a current position to the target position of the movable part of the second robot that is specified from a target position of the second robot; and
      correct the trajectory of the movable part of the second robot so as to avoid the trajectory of the movable part of the first robot in the event of collision between the first robot and the second robot.

2. The control system according to claim 1, wherein the plurality of robots receive the control data via the network every predetermined period.

3. The control system according to claim 2, wherein the processor further calculates a planned position of the movable part of the second robot every predetermined period from the current position of the movable part of the second robot to the target position of the movable part of the second robot.

4. The control system according to claim 3, wherein
   the processor of the second robot is further configured to:
   calculate a first perimeter range trajectory being a trajectory in a predetermined range comprising a perimeter of the movable part of the first robot based on the trajectory of the movable part of the first robot, and calculating a second perimeter range trajectory being a trajectory in a predetermined range comprising a perimeter of the movable part of the second robot based on the trajectory of the movable part of the second robot calculated by the processor, and the processor determines whether the first robot and the second robot collide by determining whether the first perimeter range trajectory is comprised in the second perimeter range trajectory.

5. The control system according to claim 4, wherein in the event it is determined by the processor that the first robot and the second robot collide, the processor corrects the trajectory of the movable part of the second robot so as to avoid the trajectory of the movable part of the first robot, and adds, to the control data, planned position information indicating a planned position of the second robot in the corrected trajectory after a next predetermined period;

the processor outputs, to the network, the control data to which the planned position information is added.

6. The control system according to claim 1, wherein a priority in avoiding collision with any other robot is set for each of the plurality of robots, wherein the priority of the second robot is lower than the priority of the first robot, and the second robot avoids collision with the first robot.

7. The control system according to claim 6, wherein the second robot calculates a trajectory of any other robot among the plurality of robots in addition to the first robot, and avoids collision with the any other robot.

8. A control method of a control system in which a control device and a plurality of robots are connected in series to a same network, the control device being configured to add information indicating target positions of movable parts of the plurality of robots to control data, and transmit the control data to the network, the plurality of robots comprising a first robot and a second robot, wherein the control method of a control system comprises performing in the second robot:

a step of acquiring, via the network, the control data to which trajectory identification information for specifying a trajectory from a current position to a target position of a movable part of the first robot and target position information indicating a target position of a movable part of the second robot are added;

a determination step of determining whether the first robot and the second robot collide based on the trajectory of the movable part of the first robot and a trajectory from a current position to the target position of the movable part of the second robot that is specified from a target position of the second robot; and a trajectory calculation step of correcting the trajectory of the movable part of the second robot so as to avoid the trajectory of the movable part of the first robot in the event of collision between the first robot and the second robot.

* * * * *